May 1, 1951        J. C. ROGERS        2,551,338
LIQUID-LEVEL FLIGHT INDICATOR
Filed Sept. 8, 1949        2 Sheets—Sheet 1
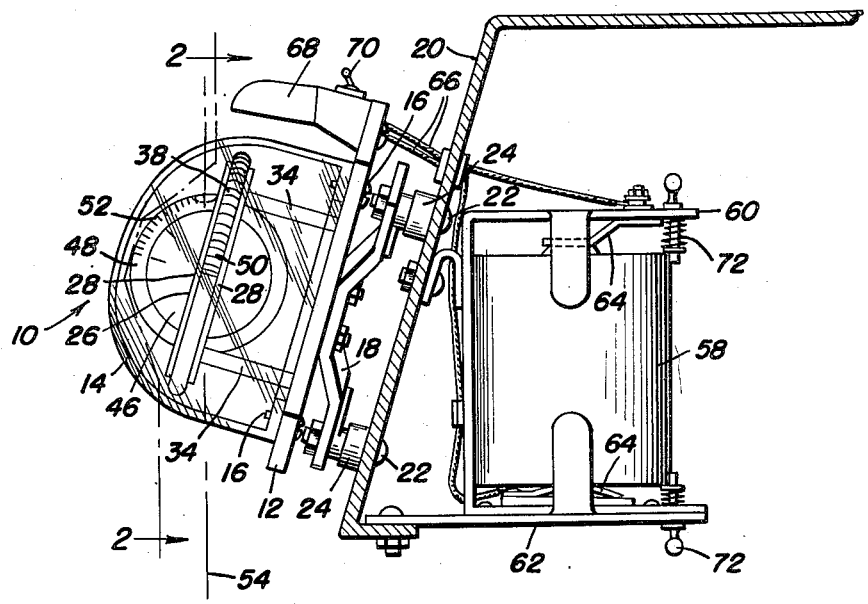
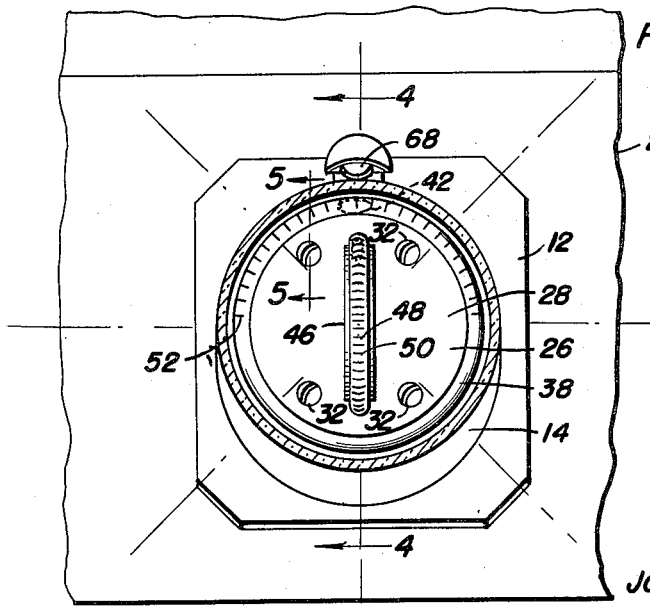
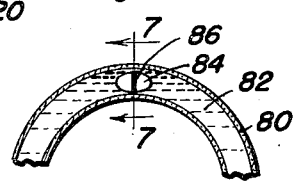
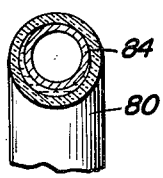
Johnnie C. Rogers
INVENTOR.

May 1, 1951 J. C. ROGERS 2,551,338
LIQUID-LEVEL FLIGHT INDICATOR
Filed Sept. 8, 1949 2 Sheets-Sheet 2
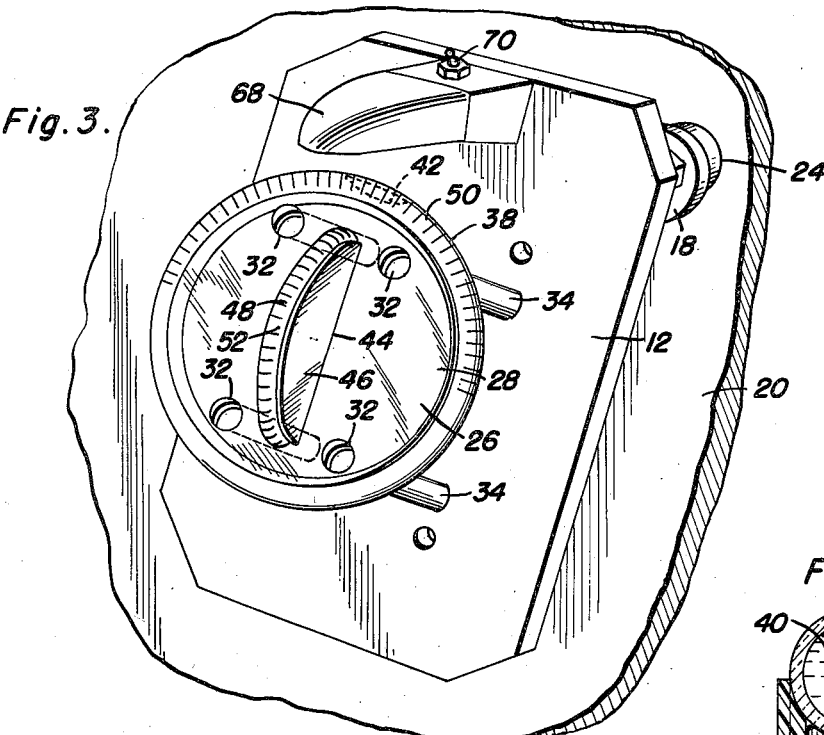
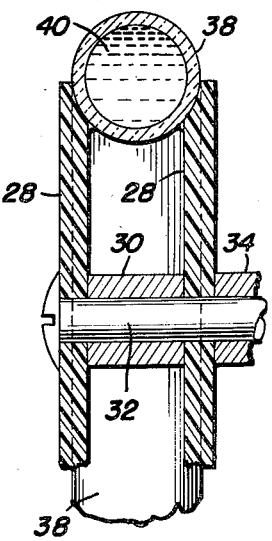
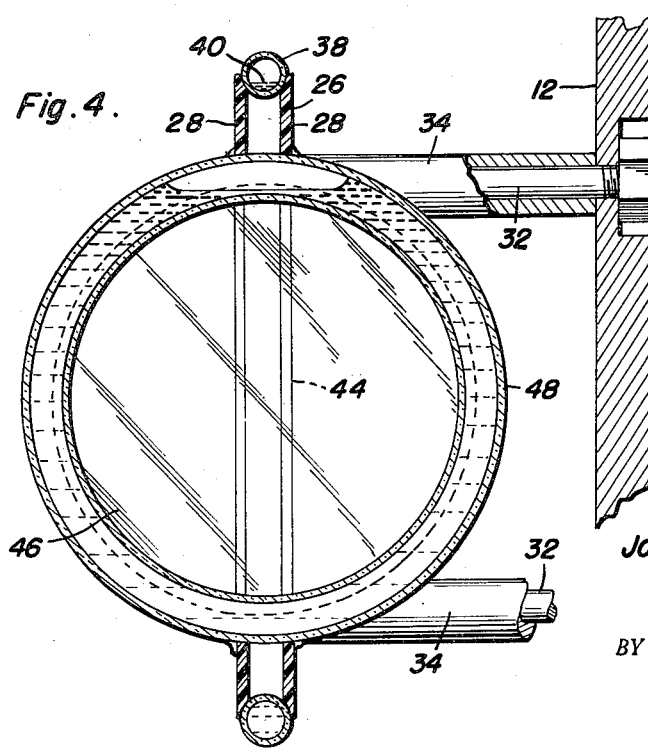
Johnnie C. Rogers
INVENTOR.

Patented May 1, 1951

2,551,338

UNITED STATES PATENT OFFICE 2,551,338

LIQUID-LEVEL FLIGHT INDICATOR

Johnnie C. Rogers, Patmos, Ark.

Application September 8, 1949, Serial No. 114,527

2 Claims. (Cl. 33—212)

This invention relates to new and useful improvements and structural refinements in flight indicators for aircraft, and the principal object of the invention is to combine an "up and down" indicator with a "turn and bank" indicator so as to provide an "artificial horizon" for accurately, easily and safely guiding the aircraft in flight.

This object is achieved by the provision of two annular levels mounted at right angles to each other, an important feature of the invention residing in the provision of means for mounting the two levels in the aforesaid manner on the instrument panel of the aircraft.

Another feature of the invention resides in the construction of the levels per se, while an additional feature involves the provision of means for illuminating the instrument independently of the electrical system of the aircraft.

Some of the advantages of the invention lie in its simplicity of construction, in its convenient and accurate operation, and in its adaptability for use on aircraft of different types.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention in situ on the aircraft instrument panel;

Figure 2 is a cross sectional view, taken substantially on the plane of the line 2—2 in Figure 1;

Figure 3 is a perspective view of the invention with the transparent cover thereof removed;

Figure 4 is a cross sectional view, taken substantially on the plane of the line 4—4 in Figure 2;

Figure 5 is a cross sectional detail, taken substantially on the plane of the line 5—5 in Figure 2;

Figure 6 is a fragmentary cross sectional view of a modified embodiment of the invention, and;

Figure 7 is a cross sectional view, taken substantially on the plane of the line 7—7 in Figure 6.

Like characters of reference are employed to designate like parts in the specification and throughout the several views.

Referring now to the accompanying drawings in detail, more particularly to Figures 1–5 thereof, the invention consists of a flight indicator designated generally by the reference character 10, the same embodying in its construction a housing consisting of a back panel 12 and a transparent, dome-shaped cover 14 which is removably attached to the back panel as at 16, while the back panel itself is provided on the rear surface thereof with a mounting bracket 18 which, in turn, is attached to the aircraft instrument panel 20 by suitable screws or studs 22, resilient bushings 24 being provided on the studs so as to prevent vibration from reaching the instrument, as will be clearly apparent.

A substantially circular holding member 26 is provided in the housing as constituted by the transparent cover 14 and consists of a pair of spaced parallel plates 28 (see Figure 5), spaced apart by a set of tubular spacers 30, while a plurality of clamping screws or studs 32 extend through the plates 28 and through the spacers 30 and also attach the entire member 26 to the back panel 12, as will be clearly apparent. Suitable spacers 34 of appropriate length are provided between the panel 12 and the members 26 for supporting the latter in spaced relation to the back panel, and it is to be noted that the opposing marginal edge portions of the plates 28 are clamped against opposite sides of an annular level 38 which is preferably formed from transparent material and contains a quantity of suitable liquid 40 (see Figure 4) which almost completely fills the level, that is, with the exception of an air space 42 which seeks a location at the extreme top of the level as indicated in Figures 2 and 3.

The member 26 is also provided with a diametrically extending slot or opening 44 and a second, relatively smaller molding member 46, similar in construction to the member 26, is secured in the slot, being disposed at right angles to the member 26, substantially as shown.

A second annular level 48, similar to the level 38 is mounted on the periphery of the member 46, and it is to be noted that the levels 38, 48 are provided with suitable graduations 50, 52 respectively, with respect to which the position of the "bubbles" or air spaces in the levels may be determined.

The level 38 is disposed in a plane extending transversely of the aircraft while the level 48 is disposed in a plane extending longitudinally of the aircraft, so that the former level will effectively indicate the "turn and bank," while the latter level will similarly indicate "up or down" direction of flight. Moreover, combined reading of the two levels will, in effect, provide what is commonly known as an "artificial horizon," with the level 38 functioning about the vertical axis 54 (see Figure 1) while the level 48 functions about the vertical axis 56 (see Figure 2).

It is to be also noted that the two levels are mounted in such a manner that an angular deviation of one level from a vertical axis does not affect the reading of the second level.

In order to assure that the instrument is illuminated when flying at night notwithstanding failure of the electrical system of the aircraft, means are provided for illuminating the instrument by an electric battery 58 which is mounted behind the instrument panel 20 in a U-shaped bracket 60 which, in turn, is attached to the instrument panel by a supporting strap 62 (see Figure 1) the bracket 60 being provided with appropriate contacts 64 which, in turn, are connected through the medium of a pair of conductors 66 to an electric lamp 68 mounted on the panel 12 and controlled through the medium of a suitable switch 70. If desired, spring pressed keepers 72 may be provided on the bracket 60 for the purpose of removably retaining the battery 58 therein, as will be clearly apparent.

Referring now to the modified embodiment of the invention illustrated in the accompanying Figures 6 and 7, these figures show an improved level such as may be used in substitution for either or both of the levels 38, 48, the improved level consisting of a hermetically sealed transparent annular tube 80 containing a quantity of liquid 82, but in place of the usual "air bubble" a buoyant indicating element 84, preferably in the form of a hollow body of suitable material, is carried by the liquid 82 and is movable longitudinally in the tube 80 in accordance with angular deviation of the latter from a vertical axis. To facilitate convenient reading, the indicating element 84 may be provided with a circumferential index line or indicator line 86 which, if convenient, may be painted thereon with luminous paint, or the like, so that it may be readily observed at night.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. A flight indicator comprising a housing adapted for attachment to a support and including a dome shaped transparent cover secured to a base plate, a first circular holding member comprising a pair of spaced plates provided in said housing, a first annular level mounted on the periphery of said member between said plates, said plates being provided with aligned diametrically extending slots, a second circular holding member mounted in said slot at right angles to said first circular holding member, and a second annular level mounted on the periphery of said second holding member.

2. A flight indicator comprising a housing adapted for attachment to a support and including a dome shaped transparent cover secured to a base plate, a first circular holding member comprising a pair of spaced plates provided in said housing, a first annular level mounted on the periphery of said member between said plates, said plates being provided with aligned diametrically extending slots, a second circular holding member mounted in said slot at right angles to said first circular holding member, and a second annular level mounted on the periphery of said second holding member, a set of spacers between said plates, and a set of fastening elements extending through said plates and through said spacers and secured to said base plate clamping the marginal edge portions of said plates against opposite sides of the first annular level.

JOHNNIE C. ROGERS.

REFERENCES CITED

The following references are of record in the file of this patent:

UNITED STATES PATENTS

| Number | Name | Date |
|---|---|---|
| 613,160 | Lankford | Oct. 25, 1898 |
| 1,153,012 | Bartha | Sept. 7, 1912 |
| 1,233,756 | Cox | July 17, 1917 |
| 1,264,705 | Spencer | Apr. 30, 1918 |
| 1,765,551 | Vayda | June 24, 1930 |
| 1,898,162 | Bair | Feb. 21, 1933 |
| 2,112,635 | Rodgers | Mar. 29, 1938 |
| 2,221,152 | Rylsky | Nov. 12, 1940 |
| 2,308,635 | Walker | Jan. 19, 1943 |
| 2,344,241 | Flint | Mar. 14, 1944 |

FOREIGN PATENTS

| Number | Country | Date |
|---|---|---|
| 496,559 | France | 1919 |